(12) United States Patent　　(10) Patent No.: US 10,596,910 B2
Nakahara et al.　　(45) Date of Patent: Mar. 24, 2020

(54) POWER RECEIVING UNIT AND POWER SUPPLY SYSTEM HAVING THE SAME

(71) Applicant: Yazaki Corporation, Tokyo (JP)

(72) Inventors: Takahiro Nakahara, Susono (JP); Ryohei Nishizaki, Susono (JP); You Yanagida, Susono (JP)

(73) Assignee: Yazaki Corporation, Tokyo (JP)

( * ) Notice: Subject to any disclaimer, the term of this patent is extended or adjusted under 35 U.S.C. 154(b) by 313 days.

(21) Appl. No.: 15/232,069

(22) Filed: Aug. 9, 2016

(65) Prior Publication Data

US 2016/0347188 A1　Dec. 1, 2016

Related U.S. Application Data

(63) Continuation of application No. PCT/JP2015/051478, filed on Jan. 21, 2015.

(30) Foreign Application Priority Data

Feb. 14, 2014　(JP) ................................ 2014-026080

(51) Int. Cl.
*H02J 50/10*　(2016.01)
*H01F 27/42*　(2006.01)
(Continued)

(52) U.S. Cl.
CPC ............. *B60L 11/182* (2013.01); *B60L 50/16* (2019.02); *B60L 53/12* (2019.02); *B60L 53/30* (2019.02);
(Continued)

(58) Field of Classification Search
CPC .... B60L 11/14; B60L 11/182; B60L 11/1824; B60L 2210/30; B60L 2240/36;
(Continued)

(56) References Cited

U.S. PATENT DOCUMENTS

2003/0057470 A1\*　3/2003　Taniguchi ............. H01L 27/016
257/303
2011/0102966 A1\*　5/2011　Takeoka ................... H01G 2/08
361/301.3
(Continued)

FOREIGN PATENT DOCUMENTS

JP　2000-228583 A　8/2000
JP　2001261944　\*　9/2001
(Continued)

OTHER PUBLICATIONS

International Search Report dated Apr. 21, 2015, issued for PCT/JP2015/051478.
(Continued)

*Primary Examiner* — Rexford N Barnie
*Assistant Examiner* — Toan T Vu
(74) *Attorney, Agent, or Firm* — Locke Lord LLP

(57) ABSTRACT

Provided are a power receiving unit suppressing temperature rise of at least one of a coil and a capacitor, and a power supply system having the power receiving unit. The power receiving unit includes a coil and a capacitor body used for noncontactly receiving the power transmitted from the power supply device, and a receiving side case including therewithin a space housing the coil and the capacitor body. A pace K inside the receiving side case is wholly filled with heat conduction member.

4 Claims, 5 Drawing Sheets

(51) Int. Cl.
*H01F 37/00* (2006.01)
*B60L 11/18* (2006.01)
*H02J 50/70* (2016.01)
*H02J 50/12* (2016.01)
*H02J 7/02* (2016.01)
*H01F 38/14* (2006.01)
*H01F 27/02* (2006.01)
*H01F 27/22* (2006.01)
*B60L 50/16* (2019.01)
*B60L 53/30* (2019.01)
*B60L 53/12* (2019.01)

(52) U.S. Cl.
CPC .......... *H01F 27/025* (2013.01); *H01F 27/22* (2013.01); *H01F 38/14* (2013.01); *H02J 7/025* (2013.01); *H02J 50/10* (2016.02); *H02J 50/12* (2016.02); *H02J 50/70* (2016.02); *B60L 2210/30* (2013.01); *B60L 2240/36* (2013.01); *B60L 2270/147* (2013.01); *Y02T 10/70* (2013.01); *Y02T 10/7005* (2013.01); *Y02T 10/7072* (2013.01); *Y02T 10/7077* (2013.01); *Y02T 10/7241* (2013.01); *Y02T 90/12* (2013.01); *Y02T 90/121* (2013.01); *Y02T 90/122* (2013.01); *Y02T 90/127* (2013.01); *Y02T 90/14* (2013.01)

(58) Field of Classification Search
CPC .. B60L 2270/147; H01F 27/025; H01F 27/22; H01F 38/14; H02J 5/005; H02J 50/10; H02J 50/12; H02J 50/70; H02J 7/025; Y02T 10/70; Y02T 10/7005

USPC ........................................................ 307/104
See application file for complete search history.

(56) References Cited

U.S. PATENT DOCUMENTS

| 2012/0217819 | A1 | 8/2012 | Yamakawa et al. |
| 2013/0181667 | A1 | 7/2013 | Takeshita et al. |
| 2013/0313913 | A1 | 11/2013 | Ichikawa |
| 2015/0130288 | A1* | 5/2015 | Ichikawa ................ H01F 38/14 307/104 |

FOREIGN PATENT DOCUMENTS

| JP | 2008-87733 | A | | 4/2008 |
| JP | 2008-087733 | | * | 8/2008 |
| JP | 2013-17255 | A | | 1/2013 |
| JP | 2013-090470 | A | | 5/2013 |
| JP | WO2013125372 | | * | 8/2013 |
| JP | 2013-172503 | A | | 9/2013 |
| JP | 2013198274 | A | | 9/2013 |
| WO | 2012/111088 | A1 | | 8/2012 |
| WO | 2013/125372 | A1 | | 8/2013 |

OTHER PUBLICATIONS

Office Action dated Nov. 7, 2017, issued for the Japanese patent application No. 2014-026080 and English translation thereof.
Office Action dated Jun. 12, 2018 issued for corresponding Japanese Patent Application No. 2014-026080.
Office Action dated Oct. 15, 2018 issued for corresponding German Patent Application No. 11 2015 000 805.5.

* cited by examiner

POWER RECEIVING UNIT AND POWER SUPPLY SYSTEM HAVING THE SAME

CROSS REFERENCE TO RELATED APPLICATIONS

This application is related to two co-pending applications: "COIL UNIT AND POWER SUPPLY SYSTEM INCLUDING THE SAME" filed even date herewith in the names of Takahiro Nakahara, Ryohei Nishizaki and You Yanagida as a national phase entry of PCT/JP2015/053223; and "COIL UNIT AND POWER SUPPLY SYSTEM" filed even date herewith in the names of Takahiro Nakahara, Ryohei Nishizaki and You Yanagida as a national phase entry of PCT/JP2015/051479; which applications are assigned to the assignee of the present application and all three incorporated by reference herein.

BACKGROUND OF THE INVENTION

Field of the Invention

The present invention is related to a power supply unit disposed in a vehicle, and including a power receiving unit nonsontactly receiving a power supplied from outside of the vehicle, and a power supply system including the power receiving unit.

Description of the Related Art

Recently, in charging a secondary battery or the like (hereinafter simply referred to as "power battery") a plugin hybrid vehicle (PHEV), an electrical vehicle (EV) or the like includes for example, a wireless (noncontact) power transmission technology that requires no physical connection like plug connection is used in order to facilitate charging work.

For example, a power supply system disclosed in PTL 1 includes a power supply part disposed on the ground in a power supply facility and a power receiving part attached to an underside of a vehicle, and noncontactly transmits power by electromagnetically coupling these power supply part and the power receiving part.

In such power supply system, since the power receiving part is attached to the underside of the vehicle, the power receiving part may be arranged close to a heating element such as a drive unit including an engine or a motor or an exhaust pipe. This power receiving part includes a coil and a capacitor included in a circuit for electromagnetic coupling, and a case housing them. A coil wire of the coil used for the power receiving part is mainly made of metal such as copper, which has property that a resistance value is increased by temperature rise, and such a ferrite-made core that is a component of the capacitor and the coil is regulated within an upper limit of usage temperature. Therefore, in order to prevent heat from the heating element of the vehicle from transmitting to the coil or the capacitor of the power receiving part, these coil and capacitor were spaced from each other to provide an insulating layer operative by air.

Disadvantageously, for example, when the vehicle arrives at a charge station after long-period traveling, where the aforementioned power supply part lies, the coil and the capacitor may lie in high temperature due to long-period exposure of reflective heat of the heating element. Therefore, a transmission effectiveness of power may decrease due to an increase of the resistance value of the coil wire, and temperature of the ferrite made core or the capacitor or the like may exceed the usage temperature upper limit.

Furthermore, provision of the insulating layer in the case likely obstructs the heat of the coil or the capacitor from discharging that has once been heated, unlikely reducing the heat of the coil and the capacitor.

The present invention is intended to solve the problems concerned. Namely, the present invention is intended to provide a power receiving unit capable of suppressing temperature rise of at least one of a coil and a capacitor, and a power supply system having the power receiving unit.

PATENT DOCUMENT

PTL 1: Japanese Patent Publication No. 2013-90470

SUMMARY OF THE INVENTION

The invention according to a first aspect, in order to achieve the above objects, is characterized a power receiving unit disposed at an underside of a vehicle, and noncontactly receiving power transmitted from a power supply part disposed on the ground, the power receiving unit comprising: a coil and a capacitor used for receiving the power; a case including therewithin a space housing the coil and the capacitor; wherein a part where at least the coil and the capacitor are arranged in the apace within the case is filled with heat conduction member.

The invention according to a second aspect is characterized in that in the invention of the first aspect, the heat conducting member is filled in a whole space within the case.

The invention according to a third aspect is characterized in that in the invention of the first or second aspect, the heat conducting member is filled in a part where at least capacitor is arranged in the space within the case, and the capacitor further includes a circuit board on which the capacitor is mounted, the circuit board including the heat conduction member.

The invention according to a fourth aspect, in order to achieve the above objects, is characterized a power supply system comprising: a power supply part disposed on the ground; a power receiving part disposed in the vehicle, the power receiving part noncontactly receiving power transmitted from the power supply part, wherein the power receiving part includes the power receiving unit according to any one of first, second, and third aspects.

According to the invention according to the first and fourth aspects, a coil and a capacitor used for receiving the power, and a case including therewithin a space housing the coil and the capacitor are included. And a part where at least the coil and the capacitor are arranged in the apace within the case is filled with heat conduction member. Thus, at least one of the coil and the capacitor is connected to the case that is covered with heat conduction member. Thereby, for example, even in the case that the case is subjected to heat of a heating member such as a drive unit or an exhaust pipe of the vehicle, the concerned heat transmits from the case near the heating element via the heat conduction member to the case near the ground, so as to be discharged. This allows the heat of the heating element, even in the case of transmitting to the coil or capacitor, to be promptly discharged, suppressing heat increase of the coil or capacitor covered by the heat conduction member.

According to the invention of the second aspect, the heat conducting member is filled in the whole space within the case. This allows for improvement of heat conductivity in the whole case, and for suppression of heat increase of the coil and capacitor housed inside thereof.

According to the invention of the third aspect, the heat conducting member is filled in a part where at least capacitor is arranged in the space within the case, and the capacitor further includes a circuit board on which the capacitor is mounted, the circuit board including the heat conduction member. As such, for example, compared with a configuration applying a glass epoxy board generally used for a circuit board to which the capacitor is mounted, application of a circuit board including the heat conduction material like a circuit board in which a layer compose of a metal plate like iron or copper or that combining ceramic particles allows for improvement of heat conductivity of the circuit board, further suppressing the heat increase of the capacitor.

DETAILED DESCRIPTION OF THE PREFERRED EMBODIMENTS

Hereinafter, with reference to FIGS. 1-4, a power supply system of one embodiment of the present invention will be described.

Figure 1:
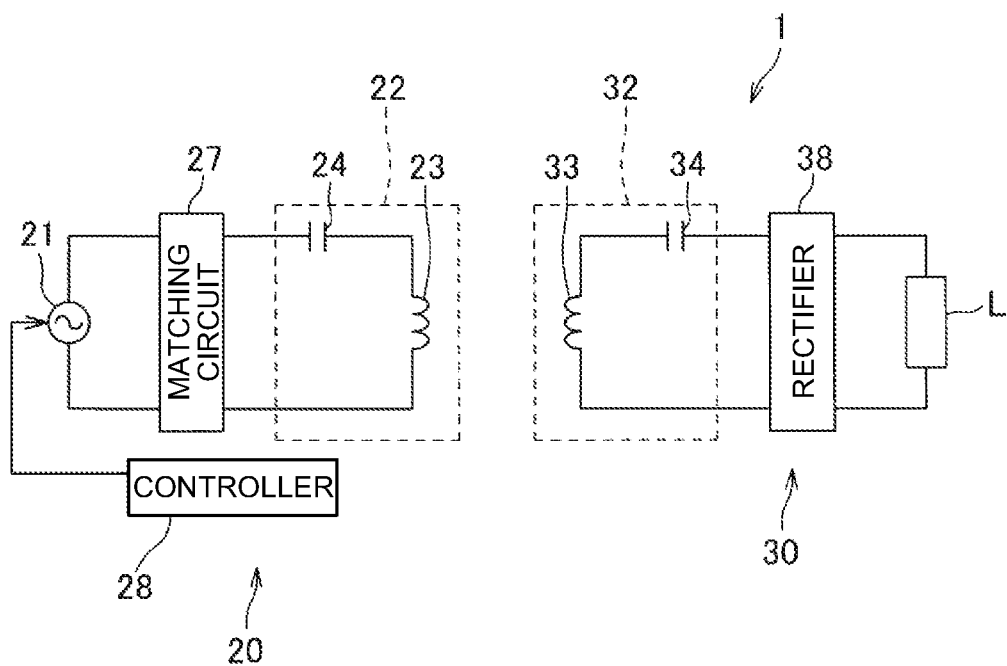
FIG. 1 is a view illustrating a general configuration of a power supply system of one embodiment of the present invention.
Figure 2:
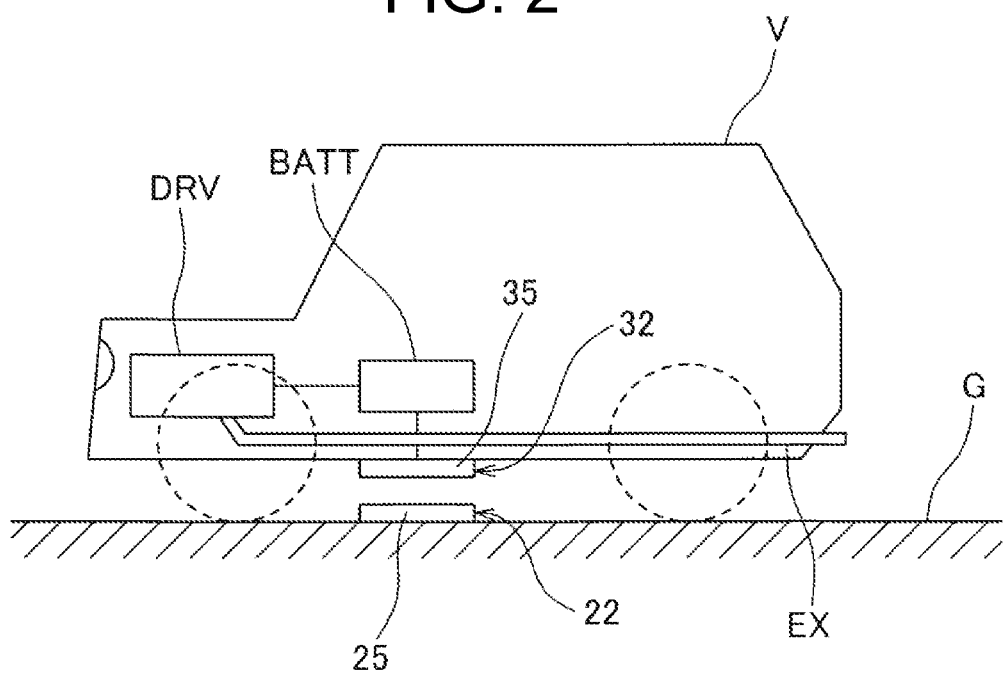
FIG. 2 is a view explaining an arrangement of a power supply unit and a power receiving unit including the power supply system of FIG. 1.
Figure 3:
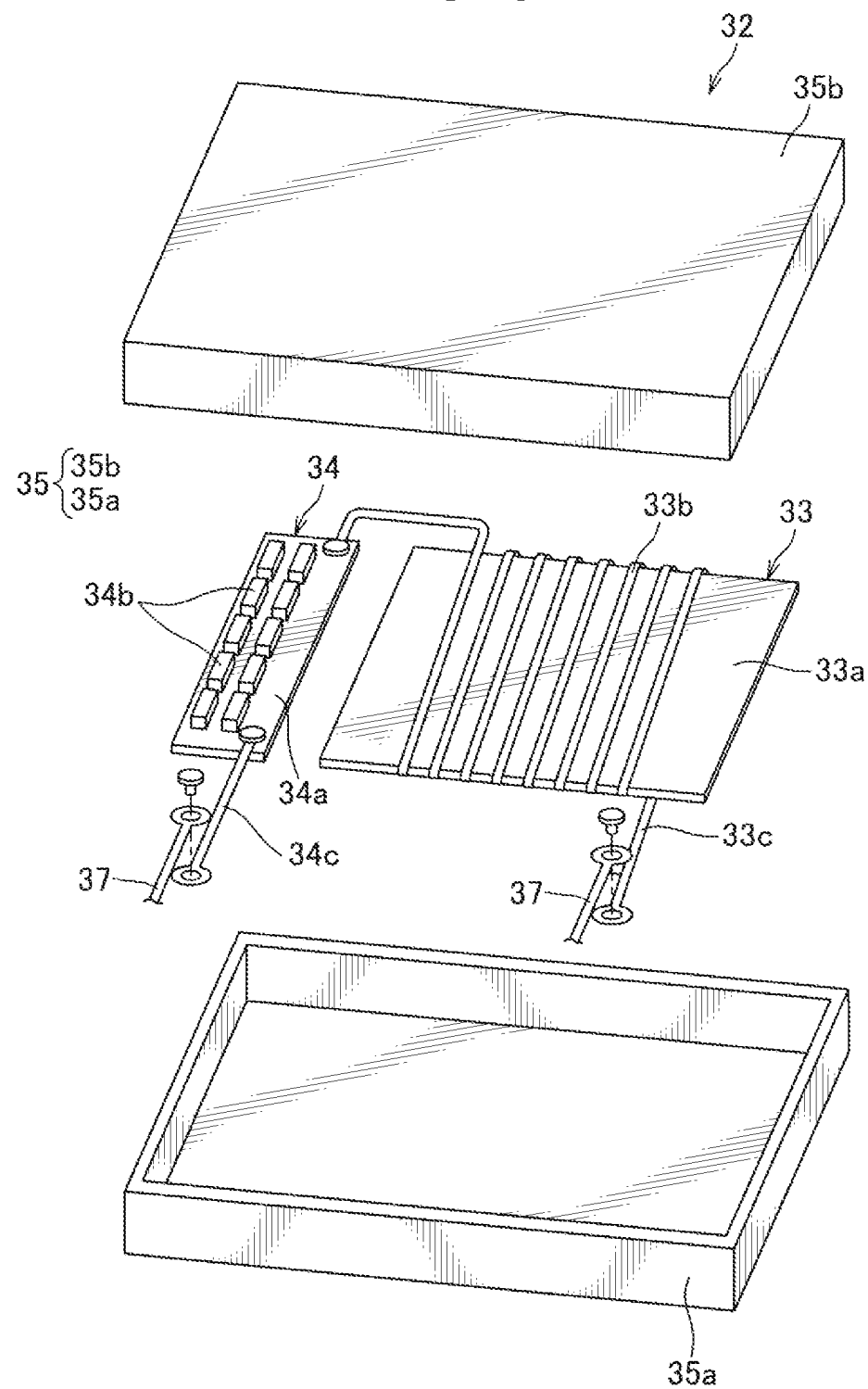
FIG. 3 is an exploded perspective view of the power receiving unit of FIG. 2.
Figure 4:
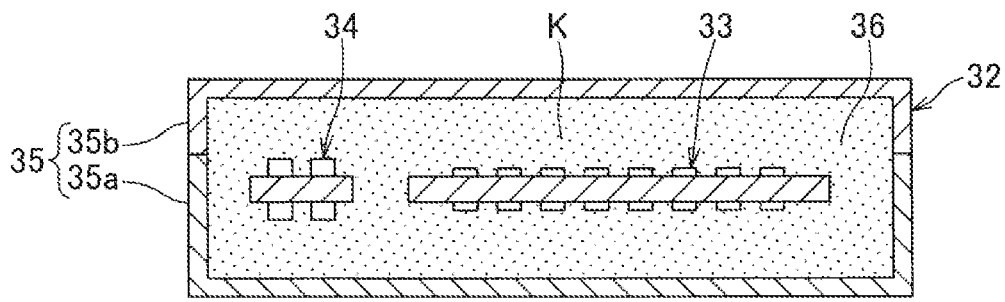
FIG. 4 is a cross-sectional view of the power receiving unit of FIG. 2.

FIG. 1 is a view illustrating a general configuration of a power supply system of one embodiment of the present invention. FIG. 2 is a view explaining an arrangement of a power supply unit and a power receiving unit including the power supply system of FIG. 1. FIG. 3 is an exploded perspective view of the power receiving unit of FIG. 2. FIG. 4 is a cross-sectional view of the power receiving unit of FIG. 2.

The power supply system of the present invention non-contactly supplies power to a vehicle from the ground by using magnetic field resonance system. Systems other than magnetic field resonance system may be used if electromagnetic coupling between a power supplier and a power receiver can transmit power.

As illustrated in FIG. 1, the power supply system 1 includes a power supply device 20 as a power supply part arranged on the ground G (shown in FIG. 2), and a power receiving device 30 as a power receiving part arranged in a vehicle V (shown in FIG. 2). This vehicle V is provided with a drive unit DRV including an engine and a motor, a power battery BATT supplying power to the motor, and an exhaust pipe EX exhausting exhaust gas of the engine. In FIG. 2 left side denotes a front side of the vehicle V.

The vehicle 20 includes a high-frequency power supply 21, a power supply unit 22, a matching circuit 27, and a controller 28.

The high-frequency power supply 21 generates and supplies a high-frequency power from a commercial power source to a power supply unit 22 mentioned later. The high-frequency power generated by the high-frequency power source 21 is set to a frequency equal to a resonance frequency of the power supply unit 22 and a resonance frequency of a power receiving unit 32 mentioned later.

The power supply unit 22 includes a power supply side coil 23 and a power supply side capacitor body 24. These power supply side coil 23 and power supply side capacitor body 24 are housed in the power supply side case 25. The power supply unit 22 is, as shown in FIG. 2, arranged on the ground G The power supply unit 22 may be embedded in the ground G.

The power supply side coil 23 is configured such that litz wire (a conductor in which a plurality of enameled fine wires is braided) is wound around a not-shown ferrite-made core. The power supply side capacitor body 24 includes a plurality of not-shown capacitors in series or in parallel, or in series and in parallel connected to each other to a not-shown circuit board and mounted thereto. The power supply side coil 23 and the power supply side capacitor body 24 are connected in series to each other, configuring a resonance circuit resonating with a predetermined resonance frequency. In the present embodiment the power supply side coil 23 and the power supply side capacitor body 24 are connected in series, but may be connected in parallel.

The matching circuit 27 is a circuit for matching impedances between the high-frequency power source 21 and the resonance circuit composed of the power supply side coil 23 and the power supply side capacitor body 24.

The controller 28 is composed of such a known microcomputer including a ROM, RAM, and CPU, and controls the whole of the power supply device 20. The controller 28 turns on or off the high-frequency power source 21 in accordance with a power transmission command for example.

The power receiving device 30 includes a power receiving unit 32 and a rectifier 38.

The power receiving unit 32 is, as shown in FIGS. 3 and 4, provided with a power receiving side coil 33 as a coil, a power receiving side capacitor body 34 as a capacitor, a power receiving side case 35 as a case for housing them, and a heat conduction member 36 with which a space K in the receiving side case 35 is filled.

The power receiving side coil 33 includes a ferrite-made rectangular plate-like core 33a, a coil wire 33b composed of litz wire wound around the core 33a in a coil-like fashion. The coil wire 33b may be composed of conductor wire other than the litz wire.

The power receiving side capacitor body 34 includes a rectangular plate-like circuit board 34a in which a wiring pattern is formed on a surface of a glass epoxy board, and a plurality of ceramic capacitors 34b mounted on the surface of the circuit board 34a and in series or in parallel or in series and in parallel connected to each other.

The power receiving side coil 33 and the power receiving side capacitor body 34 connected to each other and forms a resonance circuit resonating with the same frequency as the power supply unit 22. In the present embodiment, the power receiving side coil 33 and the power receiving side capacitor body 34 are connected in series, but may be connected in parallel.

The power receiving side case 35 is dividablly formed into a main body 35a and a cover 35b. The main body 35a is formed of material such as fiber reinforced plastics (FRP) capable of passing magnetism from the power supply device 20 for example, The cover 35b is formed of material such as aluminum or aluminum alloy capable of not passing magnetism (that becomes magnetic shield) for example. Furthermore, the cover 35b is resin-made such as FRP in the same fashion as the main body 35a, and such a magnetic shield plate composed of copper and aluminum above the cover 35b may be disposed above the cover 35b. The power receiving side case 35 forms a space K housing therewithin the power supply side coil 33 and the power receiving side capacitor body 34 by combining, and fixing with a not-shown fixing means like screw, the main body 35a and the cover 35b. In the space K in the present invention, the power receiving side coil 33 and the power receiving side capacitor body 34 are arranged horizontally. Furthermore, the power receiving side case 35 is attached to an underside of the vehicle V such that the cover 35b faces an underside of the vehicle, the main body 35a the ground G side.

A leader 33c extending from the power receiving side coil 33 and a leader 34c extending from the power receiving side capacitor body 34 are each connected to a pair of leaders 37, 37 drawn outwardly from inside of the power receiving side case 35.

The heat conduction member 36 is silicone rubber having a property of electrical insulating for example, and, as shown in FIG. 4, is filled in the whole space K in the power receiving side case 35. The heat conduction member 36 is formed such that the main body 35a of the power receiving side case 35 houses the power receiving side coil 33 and the power receiving side capacitor body 34, the cover 35 is covered, liquid silicone rubber is injected into the space K from a not-shown filling hole disposed in the power receiving case 35 and is then cured. Instead, a configuration may be suitable that heat conduction sheet made of silicone rubber is, after repeatedly wound around the power receiving side coil 33 and the power receiving side capacitor body 34, pressed into the power receiving side case 35, filling the space K in the power receiving side case 35 for example (this configuration is included in a configuration wherein heat conduction member is filled). The heat conduction member 36 may be epoxy resin for example besides silicone rubber, or any material as far as it has a property of relatively high heat conduction ratio and without departing from the object of the present invention.

The rectifier 38 transforms the high-frequency power into a direct current power that the power receiving unit 32 receives. This rectifier 38 is connected to a load L such as a charge unit used for charging the power battery BATT that is mounted on the vehicle V for example.

The abovementioned power supply system 1, when a charging operation is inputted for the power battery BATT of the vehicle V parked and a command is generated of transmission of power to the vehicle in the power supply facility, allows the controller 28 to turn on the high-frequency power source 21 so as to generate high-frequency power. Then the high-frequency power is supplied to the power supply unit 22, and the power supply unit 22 and the power receiving unit 32 magnetically resonate, the high-frequency power is transmitted from the power supply unit 22, and the high-frequency power is received by the power receiving unit 32. The high-frequency power received by the power receiving unit 32 is transformed into the direct current power, so as to be supplied to the charge unit of the vehicle V, and the power battery BATT is charged by the charge unit.

Next, an effect in the abovementioned power supply system 1 will be explained.

The drive unit DRV and the exhaust pipe EX having an engine and a motor generate heat due to travel of the vehicle, which is conducted to the cover 35b of the power receiving side case 35 of the power receiving unit 32. The heat conducted to the cover 35b, while is conducted to the power receiving side coil 33 and the power receiving side capacitor body 34 via the heat conduction member 36, is further conducted to the main body 35a of the power receiving side case 35 via the heat conduction member 36, and then is radiated to the air from the main body 35a. It follows from this that the heat conducted to the power receiving unit 32 is quickly radiated in the air.

Therefore, according to the present invention, the power receiving unit 32 includes the power receiving side coil 33 and the power receiving side capacitor body 34 used for noncontactly receiving power transmitted from the power supply device 20, and the power receiving case 35 in which the space is disposed for housing these power receiving side coil 33 and power receiving side capacitor body 34. Then the heat conduction member 36 is filled in the whole space K inside the power receiving side case 35. This configuration allows the power receiving side coil 33 and the power receiving side capacitor body 34 to be covered with the heat conduction member so as to be thermally connected to the power receiving side case 35. Therefore, even in the case that the power receiving side case 35 is subjected to the heat of the heating element such as the drive unit DRV or the exhaust pipe EX of the vehicle for example, the concerned heat is conducted from the heating element side of the power receiving case 35 via the heat conduction member 36 to the power receiving case near the ground G so as to be radiated. The heat of the heating element, even if conducted to the power receiving side coil 33 and the power receiving side capacitor body 34, is quickly radiated, suppressing temperature rise of the power receiving side coil 33 and the power receiving side capacitor body 34.

As mentioned above, the present invention is explained taking preferred embodiments, but the power receiving unit and the power supply system should not be limited to the above embodiments.

For example, the abovementioned embodiments are the configuration where the heat conduction member 36 is filled in the whole space K inside the power receiving side case 35, but is not limited thereto.

Figure 5A:
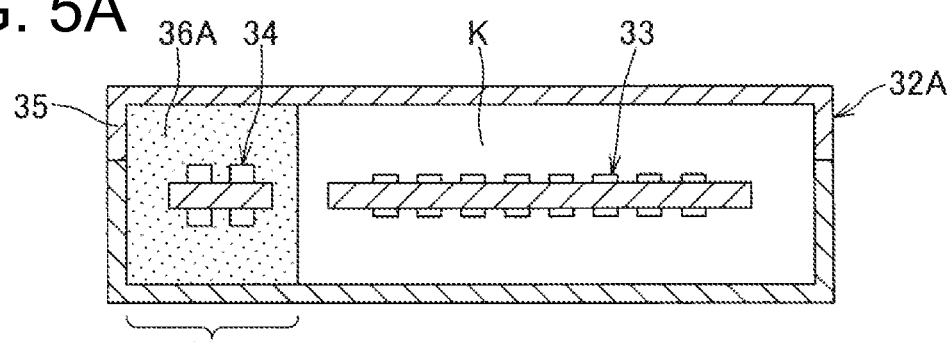
FIGS. 5A to 5C are cross-sectional views illustrating a configuration of modification example of the power receiving unit of FIG. 2.

For example, as shown in FIG. 5A, the power receiving unit 32A may be configured to include heat conduction member 36A filling only a part K1 where the power receiving side capacitor body 34 is arranged in the space K such as to cover the whole of power receiving side capacitor body 34.

Figure 5B:
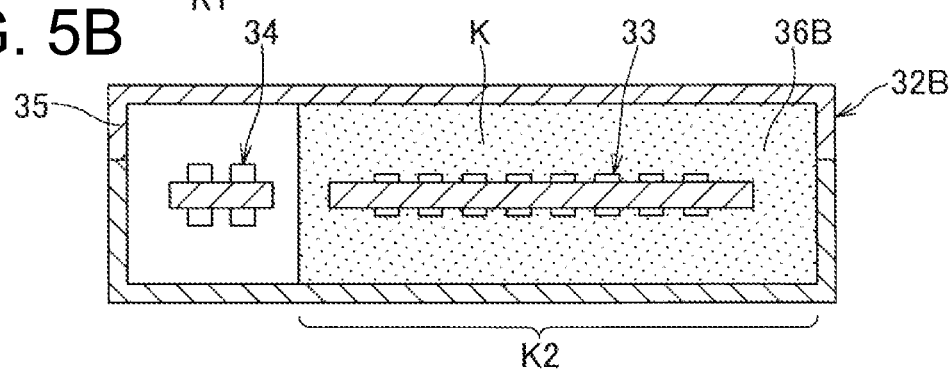
Figure 5C:
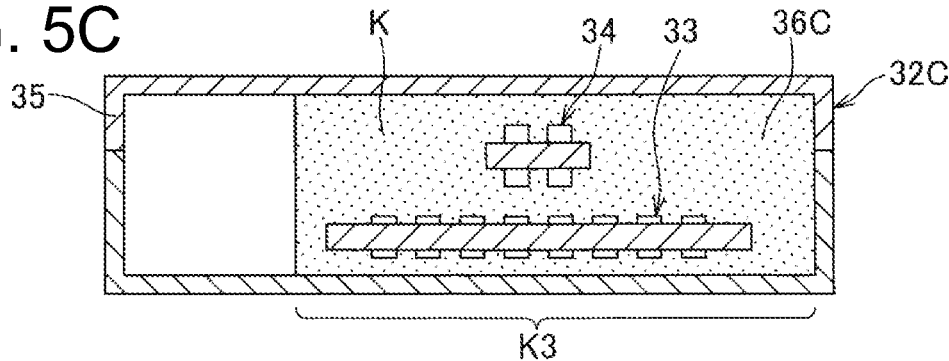

Otherwise, as shown in FIG. 5B, the power receiving unit 32B may be configured to include heat conduction member 36B filling only a part K2 where the power receiving side coil 33 is arranged in the space K such as to cover the whole of power receiving side coil 33.

Otherwise, the power receiving unit 32C may be configured to include heat conduction member 36C filling only a part K3 where the power receiving side coil 33 and the power receiving side capacitor body 34 are vertically arranged, and the power receiving side coil 33 and the power receiving side capacitor body 34 are arranged in the space K such as to cover the whole thereof.

Namely, as far as the heat conduction member fills the part where at least one of the power receiving side coil 33 and the power receiving side capacitor body 34 is arranged in the space K inside the power receiving side case 35, any arrangement of the heat conduction member is available without departing from the object of the invention.

Furthermore, though in the abovementioned embodiment the circuit board 34a of the power receiving side capacitor body 34 is composed of glass epoxy board, but in such configuration that heat conduction member 36 fills a part where at least the power receiving side capacitor body 34 in the space K is arranged, but is not limited thereto.

Figure 6A:
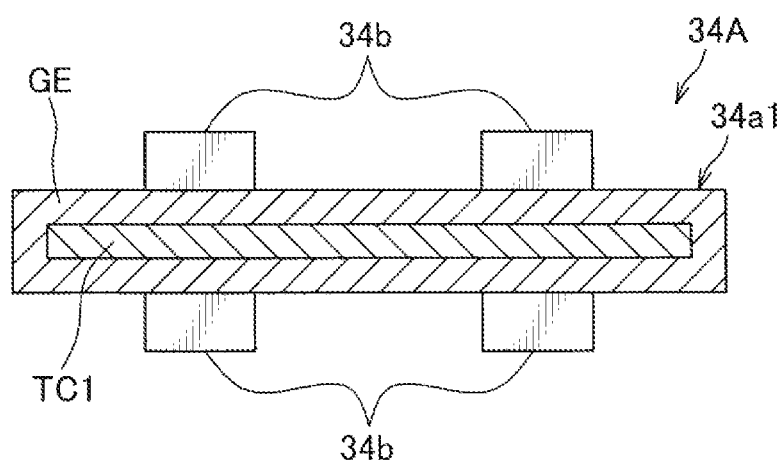
FIGS. 6A and 6B are cross-sectional views illustrating a configuration of a modification example of a circuit board including a power receiving side capacitor unit of the power receiving unit of FIG. 2.

For example, as shown in FIG. 6A, the power receiving side capacitor body 34A having a circuit board 34a1 including metal-made plate-like heat conduction material TC1 compose of metal such as copper or aluminum (including alloy thereof) inside the glass epoxy material GE may be configured.

Figure 6B:
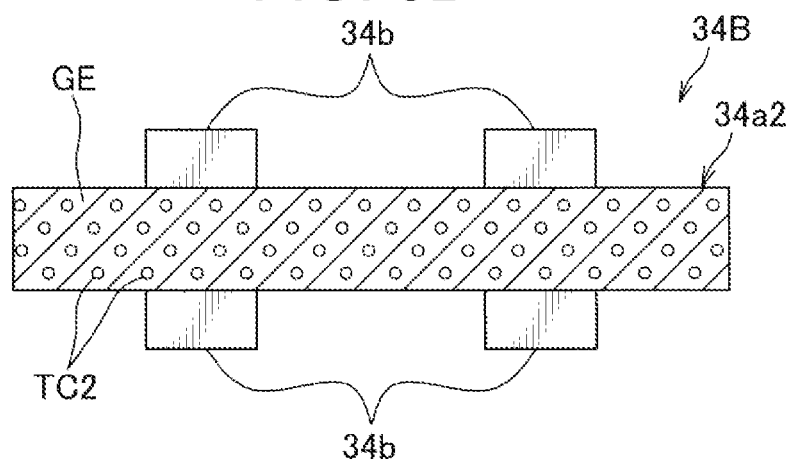

Furthermore, as shown in FIG. 6B, the power receiving side capacitor body 34B having a circuit board 34a2 formed by mixing particle ceramic filler TC2 with relatively high heat conduction property into glass epoxy material GE may be configured.

Thus, in the power receiving side capacitor, the circuit board to which a plurality of capacitors is mounted includes heat conduction material with relatively high heat conduction property such as metal or ceramic, thereby improving heat conduction property of the circuit board, compared with a configuration adapting commonly-used glass epoxy as a circuit board to which the plurality of capacitors is mounted for example, furthermore suppressing the temperature rise of the capacitor.

The abovementioned embodiments only represent typical configuration of the present invention, but the present invention is not limited thereto. Namely, those skilled in the art, following conventionally common knowledge, can implement various types within a scope without departing from the gist of the present invention. The concerned variations, as far as are still provided with the configuration including the power receiving unit and the power supply system of the present invention, should of course be included in the scope of the present invention.

(Evaluation Test)

The inventor evaluation-tested as shown below using an example 1 of the present invention and a comparative example 1.

EXAMPLE 1

In the power receiving unit 32 shown in FIGS. 3 and 4, coil wire 33b composed of litz wires with width of 8 mm and thickness of 1 mm is twenty times wound around ferrite-made core 33a with length of 250 mm, width of 265 mm, and thickness of 14 mm, to be the power receiving side coil 33. The heat conduction member 36 is plurally wound around the power receiving side coil 33 such as to cover it, which is composed of sheet-like silicone rubber. The plurality of ceramic capacitors 34b is mounted to the circuit board 34a composed of glass epoxy, the plurality of ceramic capacitors is connected in series and in parallel, and thereby made was the power receiving side capacitor body 34 which has static capacitance of 47 nF as the whole. The example 1 is made such that the power receiving side coil 33 and the power receiving side capacitor body 34 are connected in series, which are housed in the resin-made power receiving side case 35 houses together with the main body 35a and the cover 35b. In this example 1 a space between the power receiving side coil 33 and the power receiving side case 35 is filled with the heat conduction member 36. A copper-made shield plate slightly larger than the cover 35b viewed in plane view is arranged over the cover 35b at a position separated from the power receiving side coil 33 by 5 mm.

The comparative example 1 was made in the similar configuration of the example 1 other than that the heat conduction member 36 is not wound around the power receiving side coil 33 in the example 1. In this comparative example 1 a gap (space) of 7 mm was made between the power receiving side coil 33 and the power receiving side case 35.

(Evaluation Test)

An alternate current with a frequency of 100 KHz, a voltage of 150 Vrms, and a current of 16 Arms was applied, a temperature rise was measured after a predetermined time (150 minutes) has passed at a position of (1) the middle of the core 33a, (2) the middle of the coil wire 33b, and (3) the middle of the wall part in the power receiving side case 35 corresponding to the power receiving side coil 33 in an axial direction of a winding wire, and then was evaluated in the following determination standard.

(Individual Determination Standard)

Pass: temperature rise in measuring position is equal to or less than 65° C.

Failure: temperature rise in measuring position is more than 65° C.

(Total Determination Standard)

Pass: temperature rises in all measuring positions are equal to or less than 65° C.

Failure: temperature rise in any measuring position is more than 65° C.

Figure 7:
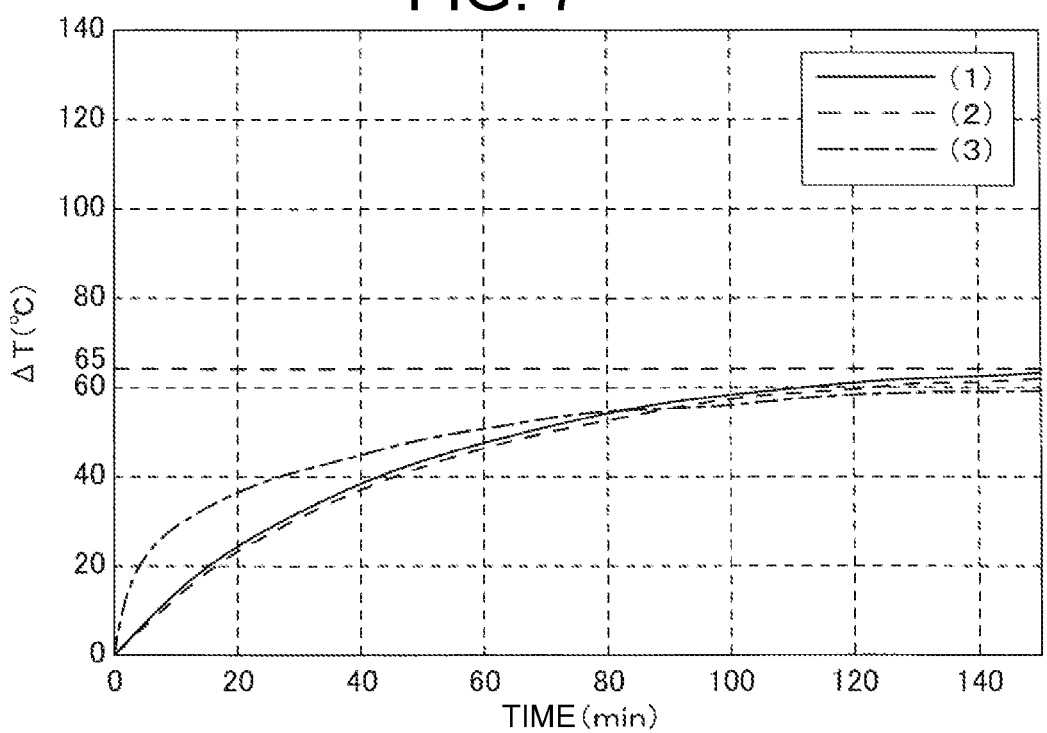
FIG. 7 is a graph illustrating a progress of temperature rise in an example of the present invention.
Figure 8:
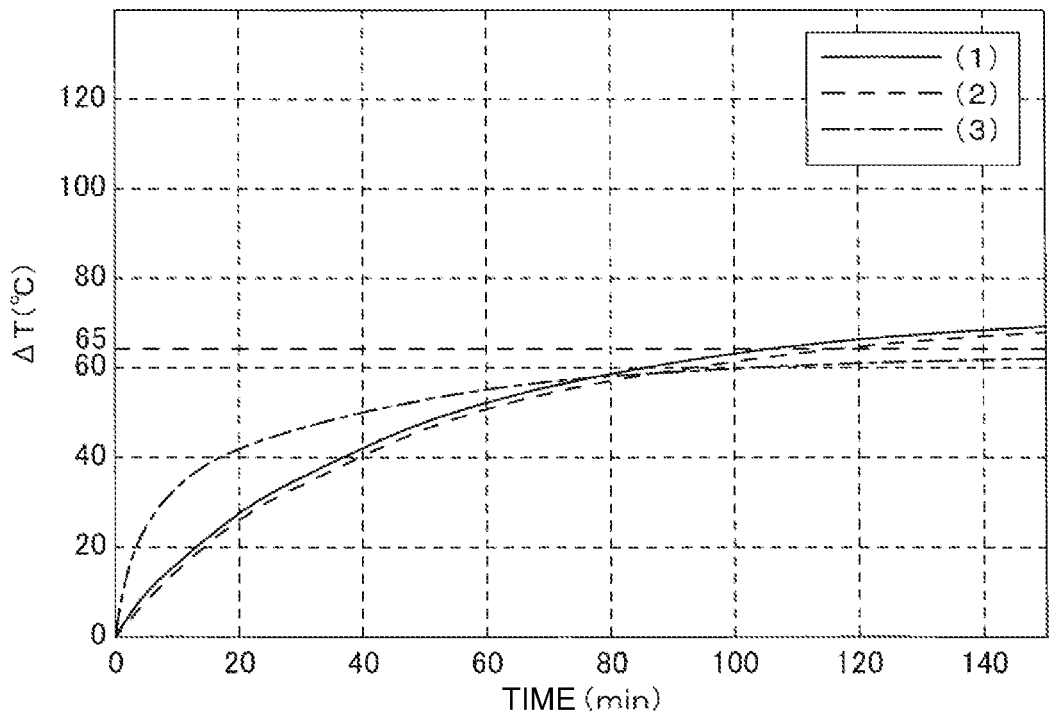
FIG. 8 is a graph illustrating a progress of temperature rise in a comparative example.

The evaluated result is shown in Table 1. Process of temperature rise is shown in FIGS. 7 and 8.

TABLE 1

| | Measurement Position | Temperature at Start (@0 min.) [° C.] | After time passed (@ 150 min.) [° C.] | Temperature Rise [° C.] | Individual Determination | Total Determination |
|---|---|---|---|---|---|---|
| EXAMPLE 1 | (1) | 29.7 | 92.5 | 62.8 | Pass | Pass |
| | (2) | 30.5 | 92.6 | 62.1 | Pass | |
| | (3) | 30.4 | 88.8 | 58.4 | Pass | |
| COMPARATIVE EXAMPLE 1 | (1) | 30.5 | 99.7 | 69.2 | Failure | Failure |
| | (2) | 30.5 | 98.9 | 68.4 | Failure | |
| | (3) | 30.5 | 92.5 | 62.0 | Pass | |

(Consideration)

An upper limit of ambient temperature about the power receiving unit 32 heated by the heating element of the vehicle V is 80° C., and heat resisting temperature of enamel coating fine wire composing the coil wire 33a of the abovementioned example 1 and the comparative example 1 is 150° C. Thereby assuming a margin of 5° C. in the temperature rise of each measuring point, the temperature rise of 65° C. was set as the standard to determine. Through the evaluation result, in the example 1 the highest temperature rise of the abovementioned items (1) and (2) falls below 65° C., whereas in the comparative example 1 the abovementioned items (1) and (2) were confirmed beyond 65° C. One example of the effect of the present invention was also confirmed through this evaluation result.

DESCRIPTION OF SYMBOLS 1 power supply system
20 power supply device (power supply part)
22 power supply unit
30 power receiving device (power receiving part)
32, 32A-32C power receiving unit
33 power receiving side coil (coil)
33*a* core
33*b* coil wire
34, 34A, 34B power receiving side capacitor (capacitor)
34*a* circuit board
34*b* ceramic capacitor
35 power receiving side case (case)
35*a* main body
35*b* cover
36, 36A-36C heat conduction member
G ground
K space
V vehicle
DRV drive unit
BATT power battery
EX exhaust pipe

What is claimed is:

1. A power receiving unit configured to be disposed at an underside of a vehicle and configured to noncontactly receive power transmitted from a power supply part disposed on the ground, the power receiving unit comprising: a coil and a capacitor body used for receiving the power; and a case including a main body made of material passing magnetism, and a cover made of material not passing magnetism, or made of resin and on which a magnetic shield plate is provided, and including a space located within the main body, the space housing the coil and the capacitor body, wherein a part where the capacitor is at least arranged in the space within the case is filled with a heat conducting member, wherein the heat conducting member is not air, wherein the capacitor body is constituted of a circuit board and a plurality of capacitors mounted on the circuit board, and wherein an entirety of the space within the case is filled with the heat conducting member such that the heat conducting member fills the entire space between the capacitor body and the main body and the entire space between the capacitor body and the cover.

2. The power receiving unit according to claim 1, wherein the circuit board includes the heat conducting member.

3. A power supply system, comprising:
a power supply part disposed on the ground; and
a power receiving part disposed in the vehicle, the power receiving part noncontactly receiving power transmitted from the power supply part, wherein
the power receiving part includes the power receiving unit according to claim 1.

4. A power supply system, comprising:
a power supply part disposed on the ground; and
a power receiving part disposed in the vehicle, the power receiving part noncontactly receiving power transmitted from the power supply part, wherein
the power receiving part includes the power receiving unit according to claim 2.

* * * * *